(12) United States Patent
Hasegawa et al.

(10) Patent No.: US 7,952,821 B2
(45) Date of Patent: May 31, 2011

(54) LENS BARREL AND IMAGING DEVICE WITH LENS BARREL

(75) Inventors: Atsushi Hasegawa, Osaka (JP); Takumi Kuwahara, Nara (JP); Manabu Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 42 days.

(21) Appl. No.: 12/527,008

(22) PCT Filed: Feb. 20, 2008

(86) PCT No.: PCT/JP2008/000285
§ 371 (c)(1),
(2), (4) Date: Aug. 13, 2009

(87) PCT Pub. No.: WO2008/102554
PCT Pub. Date: Aug. 28, 2008

(65) Prior Publication Data
US 2010/0033846 A1 Feb. 11, 2010

(30) Foreign Application Priority Data
Feb. 21, 2007 (JP) ................................. 2007-040214

(51) Int. Cl.
*G02B 7/02* (2006.01)
*G02B 15/14* (2006.01)
(52) U.S. Cl. ........ 359/823; 359/824; 359/826; 359/694; 359/696; 396/55; 396/72; 396/79
(58) Field of Classification Search .......... 359/694–704, 359/706, 822–826, 557; 396/55, 72–79, 396/82, 349; 348/376
See application file for complete search history.

(56) References Cited

U.S. PATENT DOCUMENTS

| 5,966,248 | A | * | 10/1999 | Kurokawa et al. ............ 359/697 |
| 6,268,968 | B1 | | 7/2001 | Iwasa |
| 6,553,185 | B1 | | 4/2003 | Inaba et al. |

(Continued)

FOREIGN PATENT DOCUMENTS

JP 06-289278 10/1994

(Continued)

OTHER PUBLICATIONS

International Search Report for corresponding application No. PCT/JP2008/000285 mailed May 20, 2008.

(Continued)

*Primary Examiner* — Loha Ben
(74) *Attorney, Agent, or Firm* — Renner, Otto, Boisselle & Sklar, LLP (57) ABSTRACT

A lens barrel includes a holder, a lens frame, and an elastic member. The holder includes a first guide axis and a second guide axis. The lens frame includes a first guide section which is movably fitted around the first guide axis and a second guide section which is movably fitted around the second guide axis, and retains at least one lens. The elastic member exerts an energizing force on the second guide section and is disposed between the holder and the second guide section. The lens frame moves along the optical axis direction of the lens as the first guide section is guided by the first guide axis. The elastic member energizes the lens frame along the optical axis direction of the lens by exerting an energizing force on the second guide section. The distance from the holder to the second guide section is different from that from the holder to the first guide section.

8 Claims, 8 Drawing Sheets

U.S. PATENT DOCUMENTS

| | | |
|---|---|---|
| 6,813,441 B2 * | 11/2004 | Yamazaki ............... 396/82 |
| 6,950,244 B2 | 9/2005 | Makii et al. |
| 7,292,783 B2 * | 11/2007 | Wada ..................... 396/72 |
| 7,321,470 B2 * | 1/2008 | Matsumoto et al. ....... 359/694 |
| 7,446,962 B2 * | 11/2008 | Matsumoto et al. ....... 359/819 |
| 7,729,064 B2 * | 6/2010 | Miyazawa et al. ........ 359/819 |

FOREIGN PATENT DOCUMENTS

| | | |
|---|---|---|
| JP | 07-151947 | 6/1995 |
| JP | 2000-081557 | 3/2000 |
| JP | 2003-050342 | 2/2003 |
| JP | 2004-341392 | 12/2004 |
| JP | 2004-354874 | 12/2004 |
| JP | 2005-165250 | 6/2005 |
| JP | 2007-010876 | 1/2007 |

OTHER PUBLICATIONS

Form PCT/ISA/237 for corresponding application No. PCT/JP2008/000285 and a partial English translation.

* cited by examiner

SPRING LENGTH L

US 7,952,821 B2

LENS BARREL AND IMAGING DEVICE WITH LENS BARREL

TECHNICAL FIELD

The present invention relates to an imaging device such as a film camera, a digital camera, or a camcorder. More particularly, the present invention relates to a driving mechanism for a lens frame which is provided in a lens barrel of an imaging device.

BACKGROUND ART

Many of the lens barrels which are provided in imaging devices such as film cameras, digital cameras, and camcorders have an internal focusing lens for focusing a subject image onto a film or an imaging element. Some lens barrels have an internal zoom lens for changing the size of the subject image.

In order to focus a subject image and change the subject size, a focusing lens or a zoom lens is retained so as to be movable along an optical axis direction within the lens barrel.

FIGS. 11(a) and (b) show a holder 60 and a lens frame 61 which are provided in a conventional lens barrel. FIG. 11(a) is a perspective view, whereas FIG. 11(b) is a cross-sectional view showing an I-I' cross section in FIG. 11(a). A lens is retained in the center of the lens frame 61. For example, Patent Document 1 discloses the same construction as the illustrated construction.

The lens frame 61 has a hole for allowing a slide guide 62 to extend therethrough. As the slide guide 62 is movably fitted into the hole, the lens frame 61 moves only along the optical axis direction (J-J' direction; FIG. 11(b)) of the lens. In other words, the direction of move of the lens frame 61 is restricted by the slide guide 62 so as to be along the J-J' direction.

Between the lens frame 61 and the holder 60, a spring 63 is provided such that the slide guide 62 is placed through the spring 63. The spring 63 applies an energizing force to the lens frame 61 along an E-E direction shown in FIG. 11(a), which direction is parallel to the J-J' direction.

The spring 63 retained on the slide guide 62 applies an energizing force to the lens frame 61 in the direction of J, and a driving force from a lens driving mechanism 64, e.g., a motor, is applied thereto. The lens frame 61 is driven along the J-J' direction by the driving force from the lens driving mechanism 64.

FIG. 11(c) shows a relationship between a guide span K, a length L of the spring 63, and a height N from the plane of the holder 60 to an upper face of a guide section 70. The guide section 70 corresponds to a portion at which the lens frame 61 is movably fitted around the slide guide 62. The guide span K is a length of the guide section 70 along the J-J' direction. For example, the guide span K is about 5 mm, and the length L of the spring 63 when compressed is about 2 mm. As a result, the height N is about 7 mm.

A length M from the plane of the holder 60 to the lower face of the guide section 70 is the same as the length L of the spring 63. Therefore, the height N from the plane of the holder 60 to the upper face of the guide section 70 is equal to a sum of the length L of the spring 63 and the guide span K. The length L of the spring 63 is determined depending on the length M from the plane of the holder 60 to the lower face of the guide section 70.

Generally speaking, both of the guide span K and the length L of the spring 63 should preferably be long. As the guide span K becomes longer, the precision with which the guide section 70 is guided by the slide guide 62 increases. As the length L of the spring 63 becomes longer, the load when compressing the spring can be made smaller.

On the other hand, the height N from the plane of the holder 60 to the upper face of the guide section 70 should preferably be small. The reason is that reducing the height of the lens barrel will realize thinness.

[Patent Document 1] Japanese Laid-Open Patent Publication No. 2000-81557

DISCLOSURE OF INVENTION

Problems to be Solved by the Invention

Cameras are becoming thinner in the field of compact digital cameras and the like, and reduction in thickness in millimeters is being required. However, use of a conventional lens barrel makes it difficult to realize a thin camera.

In a conventional lens barrel, the spring 63 and the guide section 70 are retained by virtue of the slide guide 62 passing therethrough, so that a total length N of the length L of the spring 63 and the guide span K is required along the J-J' direction. Allowing the length L of the spring 63 and the guide span K to become long for the aforementioned reasons will increase their total length N. Therefore, the lens barrel has been difficult to be shortened along the J-J' direction because of its structure.

Note that reducing either one of the length L of the spring 63 and the guide span K would make it possible to shorten the total length N. However, such is not preferable because it would result in a deterioration in the precision of guiding the guide section 70 or a deterioration in the elastic force of the spring 63. As described above, the length L of the spring 63 and the guide span K are already as short as they are, and therefore are difficult to be made shorter.

The present invention has been made in view of the above problems, and an objective thereof is to provide a lens barrel which permits downsizing along the optical axis direction and which prevents a deterioration in guiding precision and a deterioration in the elastic force of the spring.

Means for Solving the Problems

A lens barrel according to the present invention comprises: a holder having a first guide axis and a second guide axis; a lens frame having a first guide section movably fitted around the first guide axis and a second guide section movably fitted around the second guide axis, the lens frame retaining at least one lens; and an elastic member disposed between the holder and the second guide section for exerting an energizing force on the second guide section, wherein, the lens frame moves along an optical axis direction of the lens as the first guide section is guided by the first guide axis; the elastic member energizes the lens frame along the optical axis direction of the lens by exerting an energizing force on the second guide section; and a distance from the holder to the second guide section and a distance from the holder to the first guide section are different.

In a preferred embodiment, the distance from the holder to the second guide section is longer than the distance from the holder to the first guide section.

In a preferred embodiment, a total value of a guide span of the first guide section and the distance from the holder to the second guide section is longer than the distance from the holder to the first guide section.

In a preferred embodiment, the first guide section has a first throughhole into which the first guide axis is inserted and the first guide axis is movably fitted into the first guide section by being inserted into the first throughhole, and the second guide section has a second throughhole into which the second guide axis is inserted and the second guide axis is movably fitted into the second guide section by being inserted into the second throughhole.

In a preferred embodiment, a recess is provided in the holder, and one end of the second guide axis is disposed within the recess; and a distance from a bottom of the recess of the holder to the second guide section is longer than a distance from the holder to the first guide section at a position different from the recess.

In a preferred embodiment, the lens barrel further comprises a lens driving mechanism for driving the lens frame along the optical axis direction of the lens, wherein, the lens driving mechanism and the second guide axis are disposed so as to adjoin each other.

In a preferred embodiment, the lens driving mechanism and the second guide axis are disposed so as to further adjoin the first guide section.

An imaging device according to the present invention comprises the above lens barrel.

In a preferred embodiment, the imaging device is a camera.

A lens barrel according to the present invention comprises: a lens frame retaining at least one lens; a first guide for guiding the lens frame along an optical axis direction; a lens driving mechanism for driving the lens frame along the optical axis direction; an elastic member for energizing the lens frame along the optical axis direction; and a second guide retaining the elastic member, wherein, the first guide and the second guide are disposed away from each other.

Effects of the Invention

According to the present invention, a first guide axis and a second guide axis (e.g., a slide guide and a spring guide) are formed as separate pieces. By adjusting the positions at which the first guide section and the second guide section are provided, it becomes possible to ensure that the distance from the holder to the second guide section is different from (e.g., so as to be longer than) the distance from the holder to the first guide section, so that the length of an elastic member for providing an elastic force can be made longer than conventionally. On the other hand, by making the distance from the holder to the first guide section shorter than conventionally, it becomes possible to reduce the distance from the holder to the top of the first guide section while guaranteeing a guide span of the first guide section. As a result, a lens barrel can be downsized along its optical axis direction. Moreover, since a lens driving mechanism and a spring guide, or a lens driving mechanism and a spring guide and a slide guide are disposed so as to adjoin each other, a moment occurring in the slide guide due to the driving force from the lens driving mechanism and the moment occurring in the slide guide due to the energizing force from the spring cancel each other. As a result, the slide resistance can be reduced.

BRIEF DESCRIPTION OF DRAWINGS

FIGS. 3(a) and 3(b) are diagrams showing a holder 13 and a lens frame 18 of the lens barrel 110, where

DESCRIPTION OF REFERENCE NUMERALS 10, 11, 12 barrel frame
13 holder
14 zoom lens
15 lens frame
16 imaging element
17 focusing lens
18 lens frame
19 slide guide
20 spring guide
21 spring
22 lens driving mechanism
40a, 40b slide guide hole
41 spring guide hole
50, 53 first guide section
51 second guide section
52 cylindrical slide guide
100 camera
110 lens barrel

BEST MODE FOR CARRYING OUT THE INVENTION

Hereinafter, with reference to the attached figures, a driving mechanism for a lens frame which is provided in a lens barrel and an embodiment of an imaging device having such a driving mechanism according to the present invention will be described. In the figures, common reference numerals are assigned to common constituent elements, and their descriptions may be omitted.

Embodiment 1

First, with reference to FIG. 1, an embodiment of an imaging device according to the present invention will be described.

1. Exterior Appearance of Camera

Figure 1:
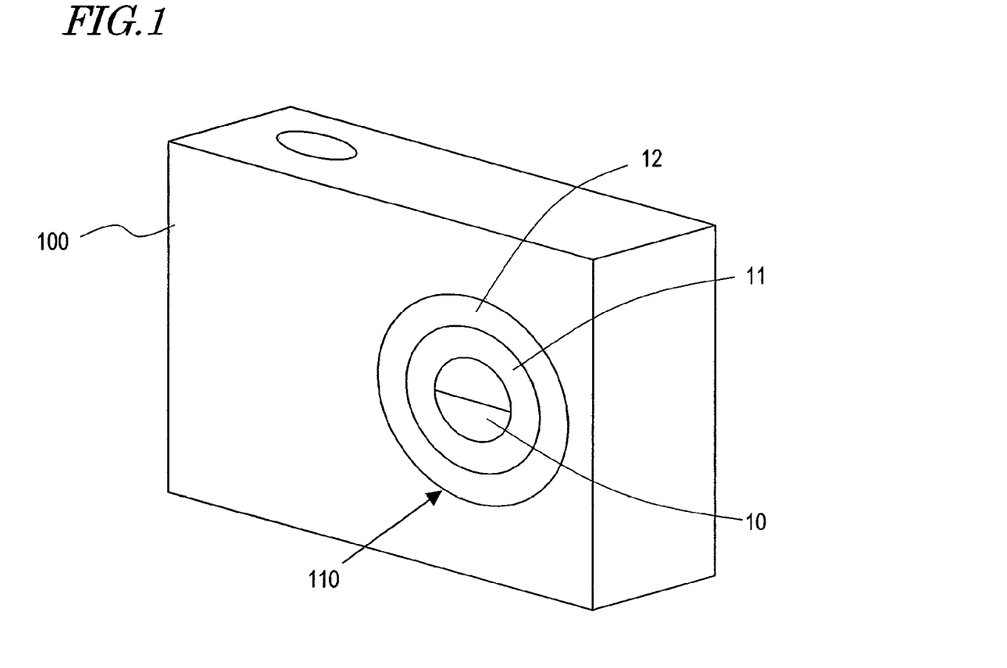
FIG. 1 is a diagram showing the exterior appearance of a camera 100 according to an embodiment of the present invention.

FIG. 1 shows the exterior appearance of a camera according to the present embodiment. The camera 100 is a so-called digital camera having a telescopic lens barrel 110.

The lens barrel 110 includes cylindrical barrel frames 10, 11, and 12, which extend or retract with activation of the camera 100. Moreover, after activation of the camera 100, the barrel frames 10, 11, and 12 extend or retract also when focusing a subject image or when changing the subject size. The camera 100 shown represents a state where the lens barrel 110 is accommodated in the housing of the camera 100.

2. Construction of Lens Barrel

Figure 2:
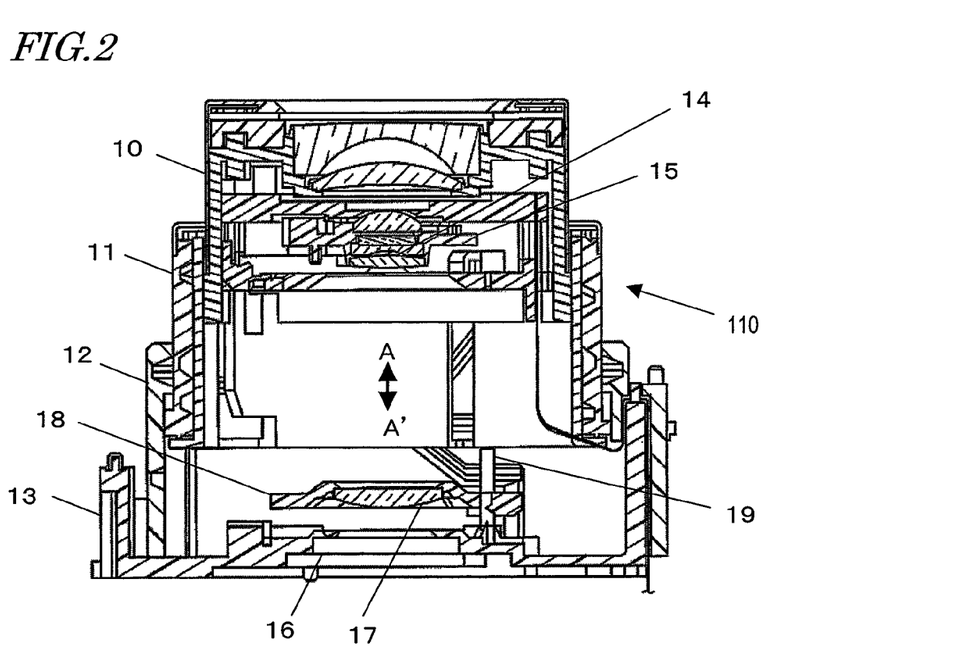
FIG. 2 is a cross-sectional view of a lens barrel 110.

FIG. 2 is a cross-sectional view of the lens barrel 110 according to the present embodiment. The lens barrel shown represents a state where the barrel frames 10, 11, and 12 have extended out.

The lens barrel 110 includes the cylindrical barrel frames 10, 11, and 12 as well as a holder 13.

The barrel frame 10 is provided so as to be movable along the optical axis (A-A') direction, inside the barrel frame 11. The barrel frame 10 retains a lens frame 15 which in turn retains a zoom lens 14, and thus the size of a subject image on an imaging element 16 can be changed as the barrel frame 10 moves along the optical axis direction.

Inside the barrel frame 12, the barrel frame 11 is provided so as to be rotatable around the optical axis and movable along the optical axis direction. As the barrel frame 11 rotates around the optical axis, the barrel frame 10 is moved along the optical axis direction, and also the barrel frame 11 itself moves along the optical axis direction.

The barrel frame 12 is affixed to the holder 13.

The holder 13 retains a lens frame 18, which in turn retains a focusing lens 17 in its center, so as to be slidable along the optical axis direction. As a result, a subject image can be focused on the imaging element 16. The lens frame 18 is restricted by a slide guide 19 so that its direction of move is in the optical axis direction. The slide guide 19 is a bar-like member which is provided on the holder 13.

3. Construction of Holder and Lens Frame

Figure 3:
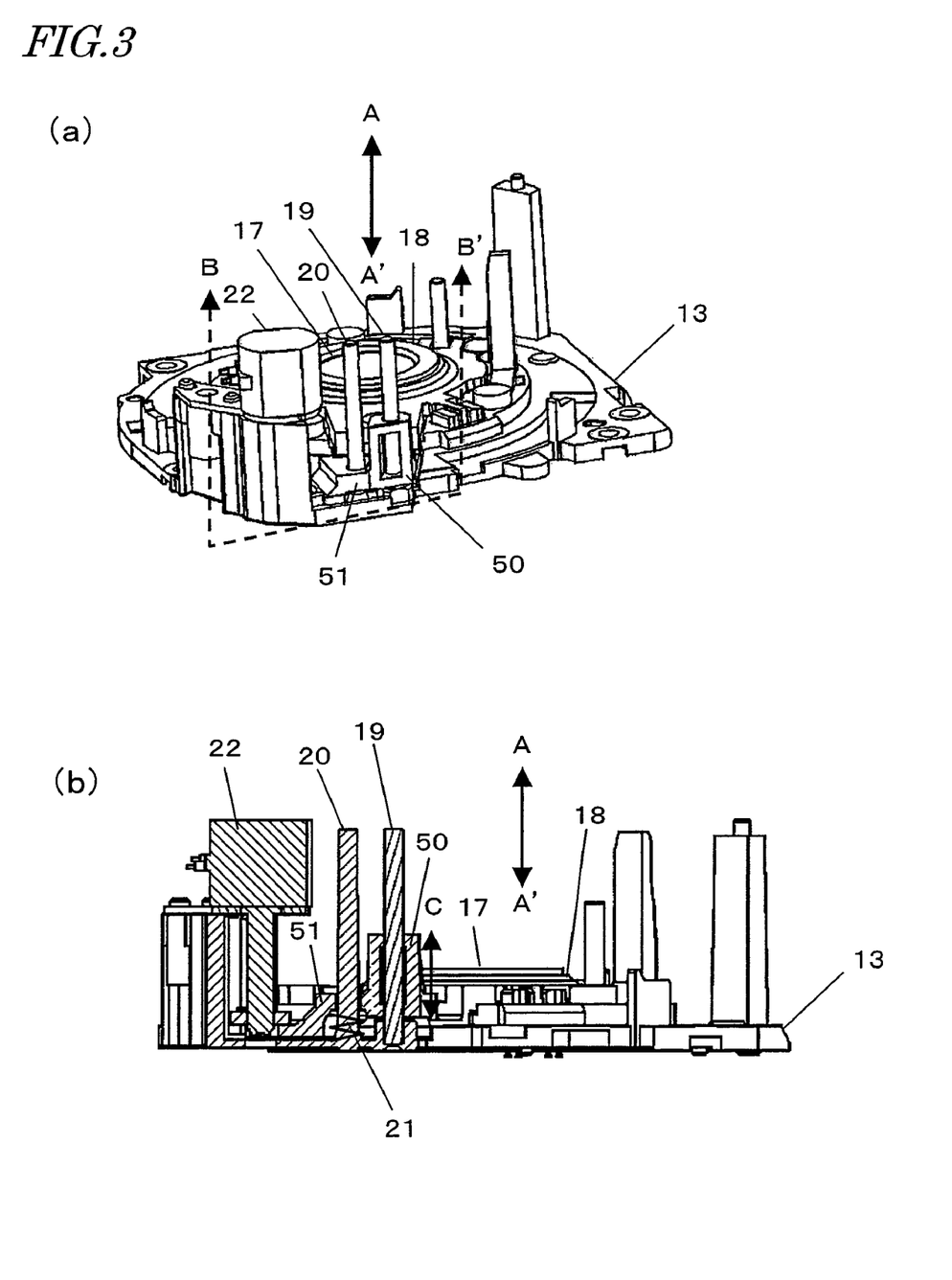
FIG. 3(a) is a perspective view.
FIG. 3(b) is a cross-sectional view along B-B' in FIG. 3(a).

FIG. 3 shows the holder 13 and the lens frame 18 of the lens barrel 110. FIG. 3(a) is a perspective view, and FIG. 3(b) is a cross-sectional view along B-B' in FIG. 3(a).

One feature of the lens barrel 110 of the present embodiment is that two guides which are disposed away from each other (the slide guide 19 and the spring guide 20) are provided on the holder 13. Although the slide guide 19 and the spring guide 20 are both composed of cylindrical axes, this is exemplary, and other shapes may be adopted.

Corresponding to the slide guide 19 and the spring guide 20, a first guide section 50 and a second guide section 51 are provided on the lens frame 18. The first guide section 50 has a slide guide hole described later, such that the slide guide 19 is inserted through the slide guide hole. The second guide section 51 has a spring guide hole described later, through which the spring guide 20 is inserted.

The slide guide 19 guides the first guide section 50, thus allowing the lens frame 18 to move along the optical axis direction of the focusing lens 17. The first guide section 50, which is movably fitted on the slide guide 19 of the lens frame 18, has a length (guide span) "C" along the optical axis (A-A') direction. The spring guide 20 allows an elastic force of the spring 21 to act on the second guide section 51, whereby the lens frame 18 is energized along the optical axis direction of the focusing lens 17.

The lens frame 18 is energized in the direction of A by the spring 21 retained on the spring guide 20, and also is driven along the optical axis (A-A') direction by a lens driving mechanism 22 such as a motor. Since an energizing force acts always in the direction of A due to the spring 21, there is no wobbling when the lens driving mechanism 22 drives the lens frame 18, whereby the precision of positioning of the lens frame 18 can be enhanced.

Figure 4:
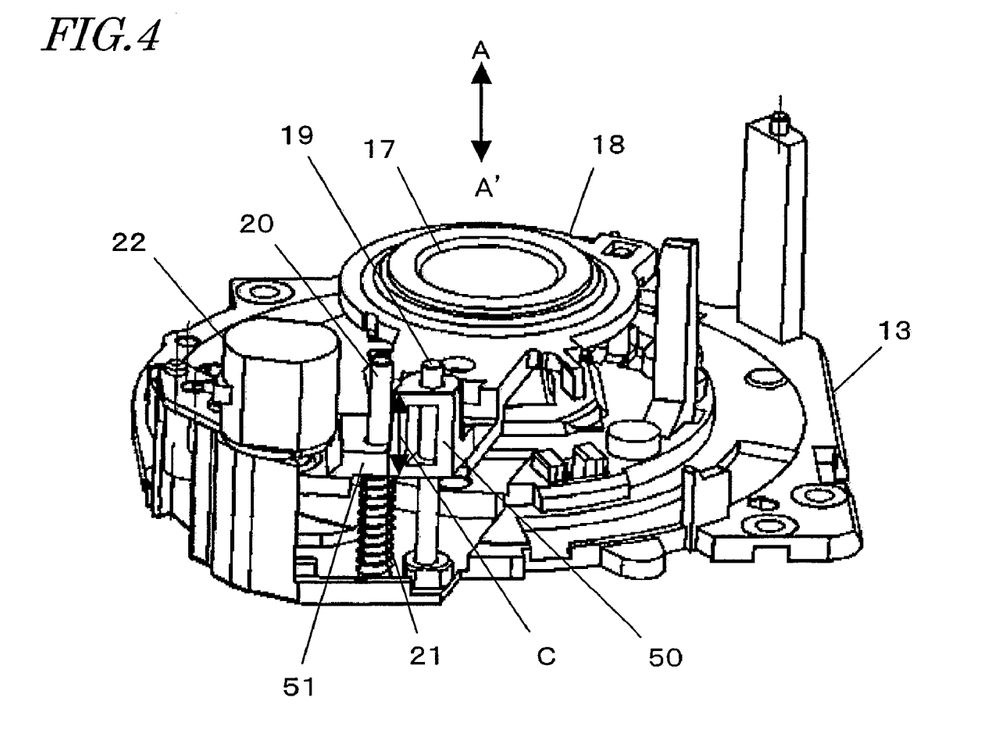
FIG. 4 is a perspective view showing a state where the lens frame 18 has been moved in the direction of A by a lens driving mechanism 22.

FIG. 4 is a perspective view showing the holder 13 and the lens frame 18 of the lens barrel 110. FIG. 3(a) shows a state in which the lens frame 18 has moved to the end in the A' direction, down to which it is movable. On the other hand, FIG. 4 shows a state where the lens frame 18 has been moved in the direction of A by the lens driving mechanism 22. It can be recognized from FIG. 4 that the spring 21 is retained on the spring guide 20. The spring 21 is interposed between the holder 13 and the second guide section 51, so as to be in contact with the second guide section 51.

Next, with reference to FIG. 5, the construction of the lens barrel 110 of the present embodiment will be described in more detail.

Figure 5:
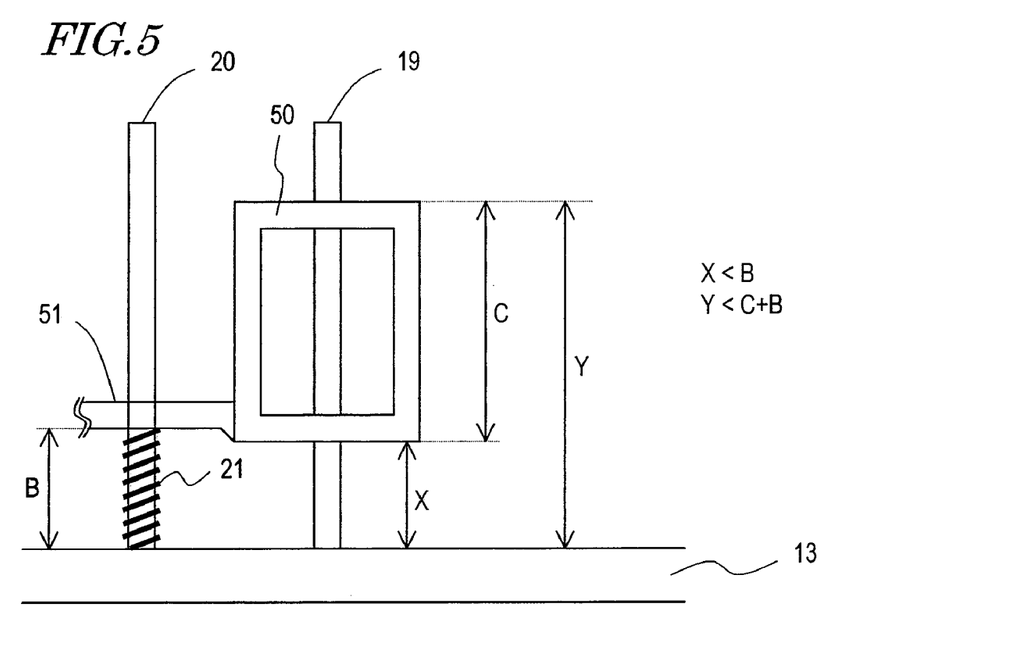
FIG. 5 is a partially enlarged view of the neighborhood of a slide guide 19 and a spring guide 20 of FIG. 3(b).

FIG. 5 is a partially enlarged view of the neighborhood of the slide guide 19 and the spring guide 20 in FIG. 3(b). The relative positioning between the slide guide 19—the spring guide 20 and the first guide section 50—the second guide section 51 is as described above.

As shown in the figure, within the movable portion, the highest position relative to the plane of the holder 13 is an upper face of the first guide section 50. Now, it is assumed that the length (distance) from the plane of the holder 13 to the upper face of the first guide section 50 is Y; the length (distance) from the plane of the holder 13 to the lower face of the first guide section 50 is X; and the length of the spring 21 is B. The guide span of the first guide section 50 is C.

By disposing the slide guide 19 and the spring guide 20 away from each other, the length B of the spring 21 can be allowed to be longer than the length X from the plane of the holder 13 to the lower face of the first guide section 50. The reason is that, relative to the holder 13, the second guide section 51 can be provided at a position higher than X.

In the example shown in the figure, X<B. As a result, the length B of the spring 21 can be allowed to be longer than in the conventional construction (FIG. 11(c)), thus making it easier to obtain an elastic force.

In accordance with the position of the second guide section 51, the length X from the plane of the holder 13 to the lower face of the first guide section 50 can be made short. Therefore, the length Y (=X+C) from the plane of the holder 13 to the upper face of the first guide section 50 can also be made short. In the conventional construction, the sum of the length B of the spring 21 and the guide span C is equal to Y; however, according to the present embodiment, the sum of the length B of the spring 21 and the guide span C is longer than Y. This means that the length B of the spring 21 and the guide span C can both be allowed to be longer than conventionally. By increasing the guide span C, the first guide section 50 will be guided by the slide guide 19 with a higher precision.

Note that the length Y may be predetermined depending on specifications. In that case, the overall length Y can be adjusted by making X short while making the guide span C long. Therefore, while satisfying given specifications, a longer guide span can be set.

According to the present embodiment, while guaranteeing the length B of the spring 21 and the length of the guide span C, it becomes possible to shorten the length Y from the plane of the holder 13 to the upper face of the first guide section 50. This makes it possible to reduce the length of the lens barrel 110 along the optical axis (A-A') direction shown in FIG. 2, and in particular the length when the lens barrel 110 is accommodated, whereby the lens barrel 110 and the camera 100 (FIG. 1) incorporating the lens barrel 110 can be made thin.

Note that a long slide guide was conventionally required, which therefore had to be made of e.g. a metal, because of difficulties of obtain a thin and long shape from a resin. However, in the present embodiment, the slide guide 19 and the spring guide 20 do not need to be made so long as in the conventional cases, and can be shaped onto the holder 13 from a resin. As a result, the number of parts can also be reduced.

4. Assembly

Figure 6:
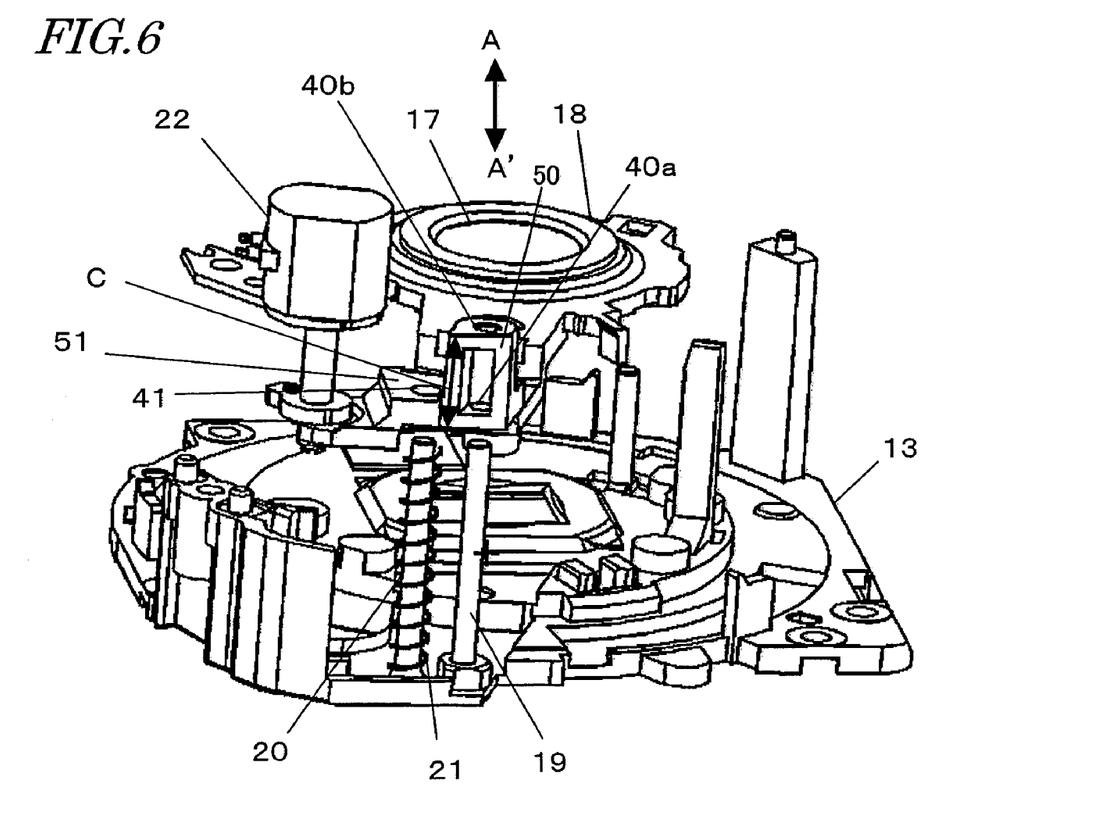
FIG. 6 is an exploded view of the holder 13 and the lens frame 18.

FIG. 6 is an exploded view of the holder 13 and the lens frame 18. First, the spring 21 is attached to the spring guide 20 of the holder 13. Next, the slide guide 19 is inserted in slide guide holes 40a and 40b which are provided in the first guide section 50 of the lens frame 18. At the same time, the spring guide 20 is inserted in a spring guide hole 41 which is provided in the second guide section 51. As a result, the holder 13 and the lens frame 18 as shown in FIG. 3 and FIG. 4 are obtained.

As described above, in the present embodiment, the slide guide 19 and the spring guide 20 are formed as separate pieces. In order for the lens frame 18 to smoothly move according to the slide guide 19 while maintaining a perpendicular state to the optical axis (A-A'), the guide span C needs to be of a certain length. By forming the spring guide 20 and the slide guide 19 as separate pieces, it becomes unnecessary to secure a length combining a length of the spring 21 and the guide span C along the optical axis (A-A') direction, which makes it possible a downsizing along the optical axis (A-A') direction.

It is desirable that the lens driving mechanism 22 and the spring guide 20 are disposed so as to adjoin each other. Furthermore, it is desirable that the lens driving mechanism 22 and the spring guide 20 are disposed so as to adjoin the slide guide 19.

Figure 7:
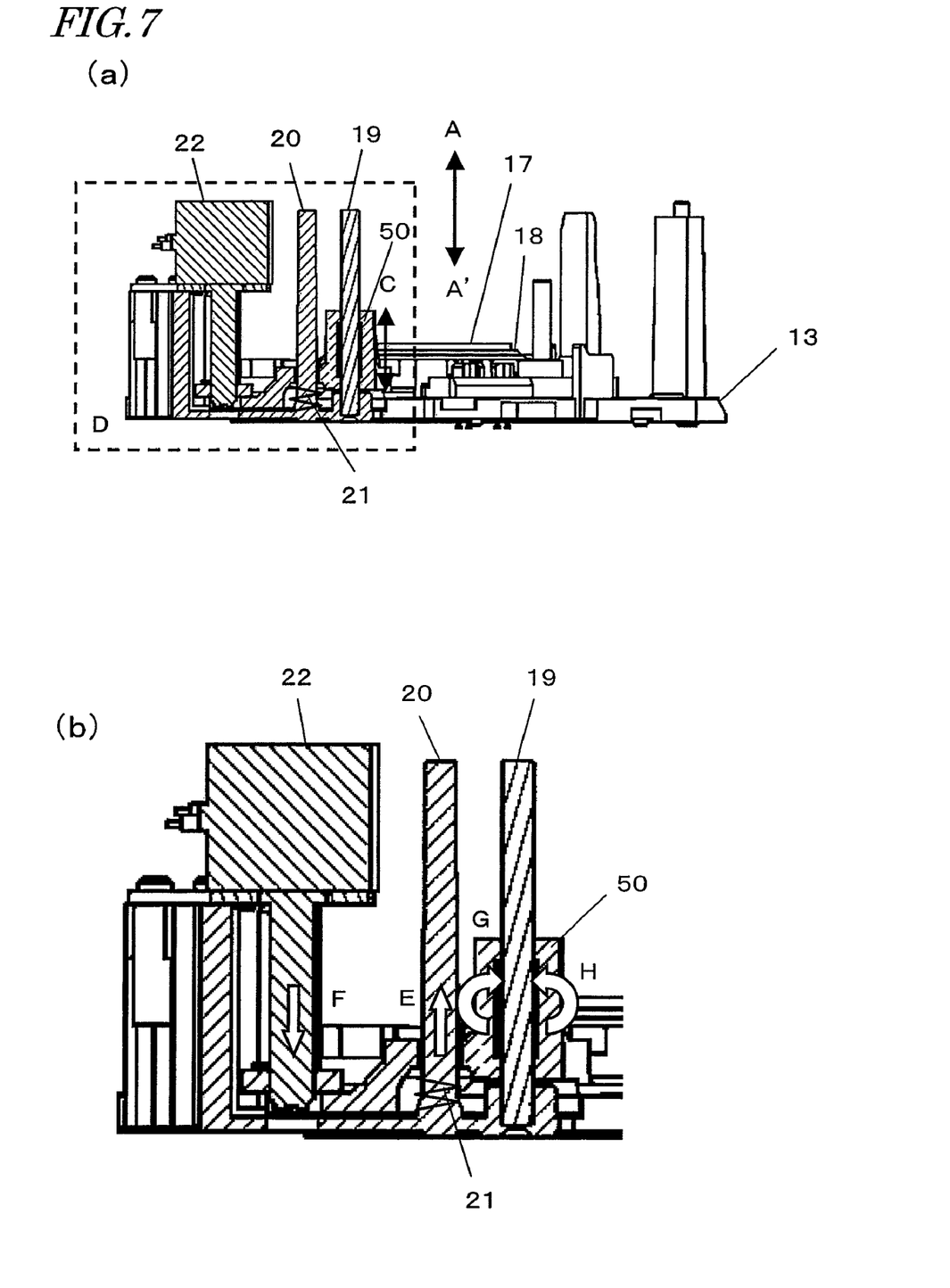
FIGS. 7(a) and 7(b) are diagrams showing moments acting on the slide guide 19, and forces by spring 21 and lens driving mechanism 22.

FIG. 7 shows a moment acting on the slide guide. FIG. 7(a) is identical to the cross-sectional view shown in FIG. 3(b), whereas FIG. 7(b) is an enlarged view of the inside of dotted frame D in FIG. 7(a).

In FIG. 7(b), an energizing force E due to the spring 21 generates a moment G for the slide guide 19. On the other hand, a driving force F of the lens driving mechanism 22, which is a reaction of the energizing force E due to the spring 21, generates a moment H for the slide guide 19.

By disposing the lens driving mechanism 22 and the spring guide 20 so as to adjoin each other, it is ensured that the moment G and the moment H cancel each other, thus making it possible to smoothly move the first guide section 50 of the lens frame 18 according to the slide guide 19.

Note that to "cancel" does not mean that the magnitude of the moment G must equal the magnitude of the moment H to render the resultant moment completely zero. By allowing a slight resultant moment to exist, the lens frame 18 will be pressed against the slide guide 19, thus making the wobbling between the lens frame 18 and the slide guide 19 constant. The degree of such wobbling is predictable, and it is possible to adjust the precision of sliding so as to accommodate such wobbling.

In consideration of the aforementioned moments, in the case where the guide span C is 5 mm and the spring length is 2 mm, the preferable distance between the lens driving mechanism 22 and the spring guide 20 is about 4 mm, and further the lens driving mechanism 22 and the spring guide 20 may be disposed at a distance of about 4 mm from the slide guide 19.

Although the embodiment illustrates an example where the present invention is applied to a focusing lens, it is applicable to all lenses which are retained so as to be movable along the optical axis direction within a lens barrel, including zoom lenses.

Although the embodiment illustrates an example where the holder 13 includes the slide guide 19 and the spring guide 20 while the lens frame 18 includes the slide guide holes 40a and 40b and the spring guide hole 41, the lens frame 18 may include a slide guide and a spring guide while the holder 13 may include a slide guide hole and a spring guide hole. Alternatively, the holder 13 and the lens frame 18 may each include the one guide and the other hole.

Although the present embodiment illustrates an example where the lens frame 18 includes the lens driving mechanism 22, the holder 13 may include a lens driving mechanism.

Hereinafter, with reference to FIGS. 8 to 10, a variant of FIG. 5 above will be described.

Figure 8:
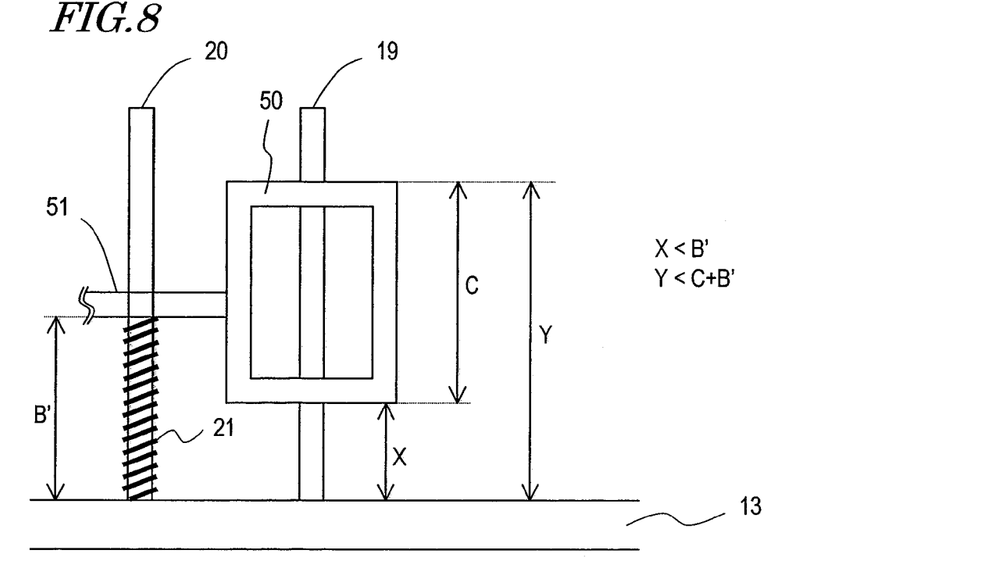
FIG. 8 is a diagram showing a construction where, as compared to FIG. 5, the second guide section 51 is attached at a more elevated position to the first guide section 50.

FIG. 8 shows a construction where the second guide section 51 is attached to the first guide section 50 at a more elevated position.

Since the second guide section 51 is provided at a position which is higher than the lower face of the first guide section 50 (height X from the holder 13), a longer length B' of the spring 21 can be obtained. This makes it even easier to obtain an elastic force with the spring 21. Unlike in the conventional construction, Y<C+B'. Note that it would also be possible to obtain an even longer spring 21 by further elevating the position of the second guide section 51.

Figure 9:
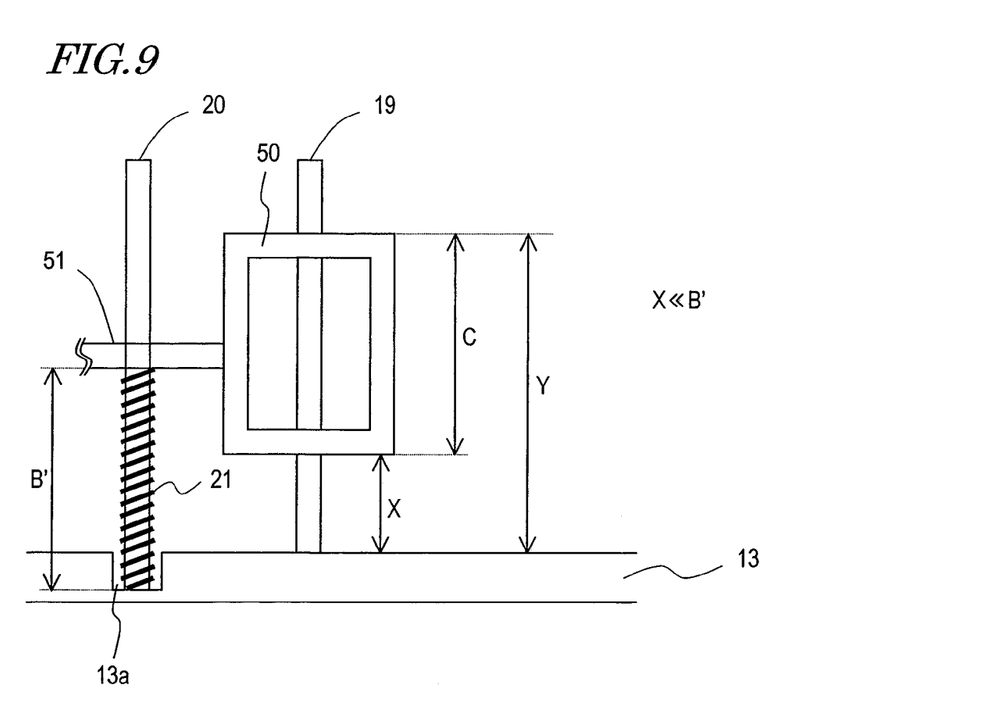
FIG. 9 is a diagram showing a construction where a longer spring 21 is provided by taking advantage of a recess 13a in the holder 13.

FIG. 9 shows a construction where a longer spring 21 is provided by taking advantage of a recess 13a in the holder 13. By providing the recess 13a in the holder 13 and disposing one end of the spring 21 within the recess 13a, the length B' of the spring 21 as measured from the bottom of the recess 13a can be made longer than in the case where the second guide section 51 is provided at the position shown in FIG. 8. In this case, the height X in FIG. 9 is to be measured from the surface of the holder 13 at a different position from the recess 13a.

Figure 11:
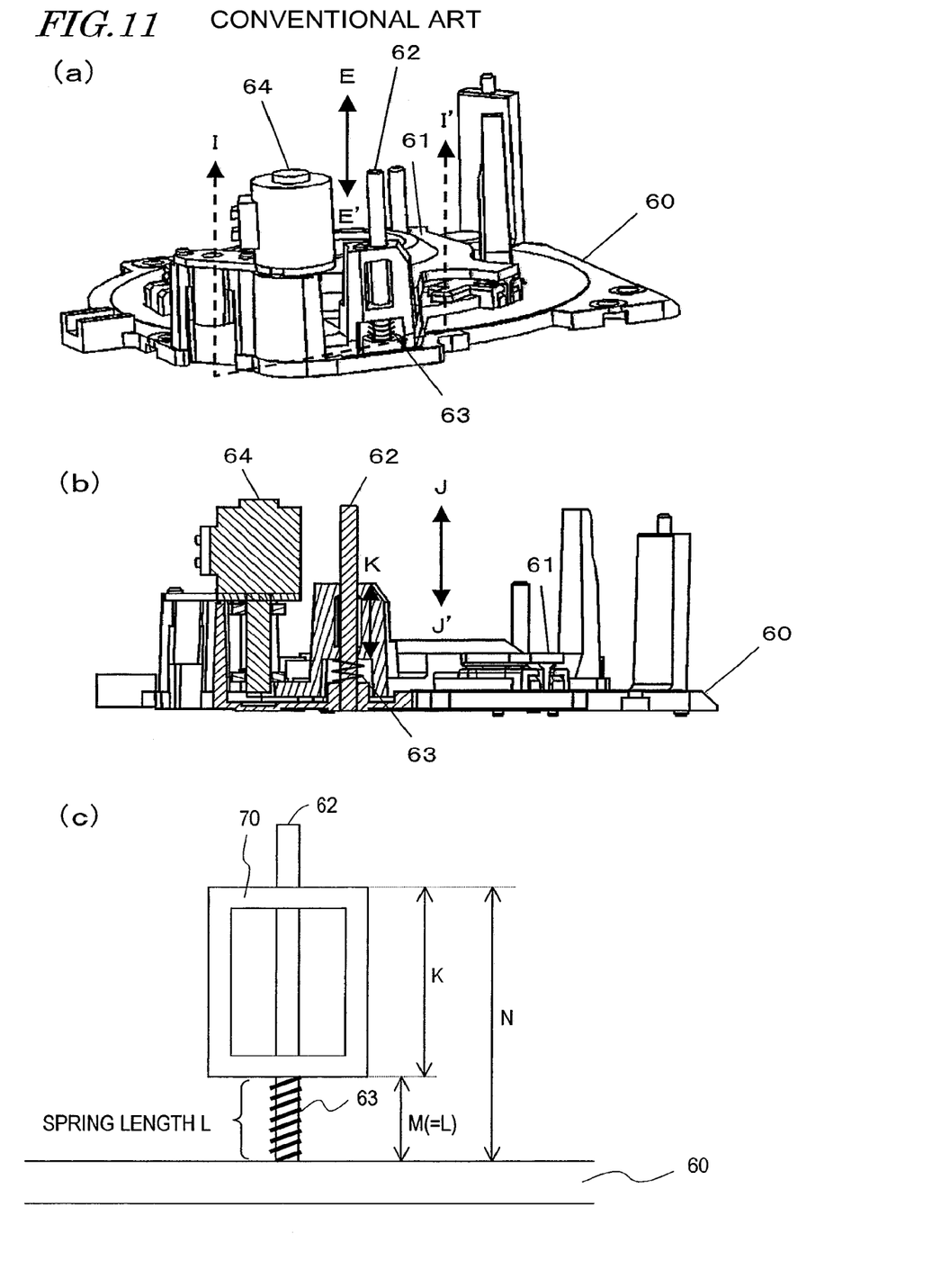
FIGS. 11(a) to 11(c) are diagrams showing a holder 60 and a lens frame 61 provided in a conventional lens barrel.

The position on the holder 13 at which to provide the recess 13a can be determined as appropriate. In the conventional example, there is only one slide guide 62 and therefore the position at which to provide the slide guide 62 (FIG. 11) must be determined by taking into consideration the relative positioning with other constituent elements, including the lens frame 18, the driving mechanism 22, and the like, and also by taking into consideration the thickness of the holder 13. However, in a construction as in the present embodiment where the slide guide 19 and the spring guide 20 are separated, the position at which to provide the spring guide 20 can be relatively flexibly determined. The position at which to provide the spring guide 20 may be determined by taking into consideration only the thickness of the holder 13 in which to provide the recess 13a.

The guide span C may be made further longer in the examples of FIGS. 8 to 9.

Figure 10:
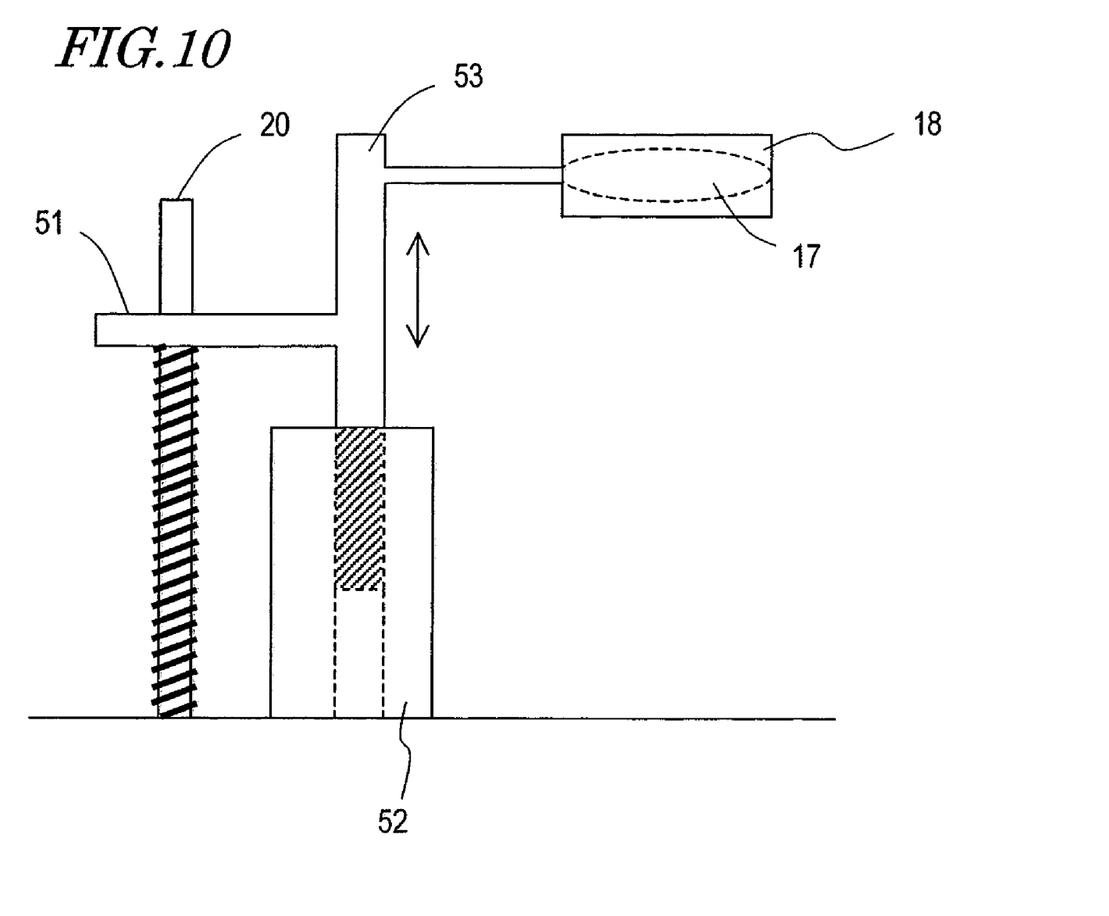
FIG. 10 is a diagram showing a construction in which a bar-like first guide section 53 which is integrated with the lens frame 18 slides within a cylindrical slide guide 52.

FIG. 10 shows a construction in which a bar-like first guide section 53 that is integrated with the lens frame 18 slides within a cylindrical slide guide 52. The second guide section 51 is connected to the first guide section 53.

As can be understood from the example above, a "slide guide" may be a bar-like axis such as the slide guide 19 in FIG. 3, or a structure having an opening such as the cylindrical slide guide 52 in FIG. 10. In either case, the first guide section 50 is guided along a virtual center axis which is defined within the "slide guide". This center axis may be regarded as a guide axis of the slide guide. This notion similarly applies to the spring guide 20, where the center axis of the spring may be regarded as a guide axis of the spring guide 20.

According to the present invention, the slide guide and the spring guide, which conventionally have been formed as one, are separately provided as the slide guide 19 and the spring guide 20. As a result, the height Y from the holder 13 to the top of the first guide section 50 can be determined without depending on the length of the spring 21. Since the length of the spring 21 can also be guaranteed, a stable elastic force of the spring 21 can be obtained.

Although a coil spring is illustrated in the figure as the spring 21, this is exemplary. Other than that, a leaf spring, a rectangular wire spring, or the like may also be used.

INDUSTRIAL APPLICABILITY

According to the present invention, a lens barrel can be downsized along its optical axis direction, and thus the present invention is applicable to and useful in an imaging device such as a film camera, a digital camera, or a camcorder. In particular the present invention is applicable to and useful in a compact-type digital camera, which is subject to severe downsizing requirements.

The invention claimed is:

1. A lens barrel comprising:
   a holder having a first guide axis and a second guide axis;
   a lens frame having a first guide section movably fitted around the first guide axis and a second guide section movably fitted around the second guide axis, the lens frame retaining at least one lens; and
   an elastic member disposed between the holder and the second guide section for exerting an energizing force on the second guide section, wherein,
   the lens frame moves along an optical axis direction of the lens as the first guide section is guided by the first guide axis;
   the elastic member energizes the lens frame along the optical axis direction of the lens by exerting the energizing force on the second guide section;
   a distance from the holder to the second guide section and a distance from the holder to the first guide section are different; and
   the distance from the holder to the second guide section is longer than the distance from the holder to the first guide section.

2. The lens barrel of claim 1, wherein a total value of a guide span of the first guide section and the distance from the holder to the second guide section is longer than the distance from the holder to the first guide section.

3. The lens barrel of claim 1, wherein, the first guide section has a first throughhole into which the first guide axis is inserted and the first guide axis is movably fitted into the first guide section by being inserted into the first throughhole, and the second guide section has a second throughhole into which the second guide axis is inserted and the second guide axis is movably fitted into the second guide section by being inserted into the second throughhole.

4. The lens barrel of claim 1, wherein,
   a recess is provided in the holder, and one end of the second guide axis is disposed within the recess; and
   a distance from a bottom of the recess of the holder to the second guide section is longer than a distance from the holder to the first guide section at a position different from the recess.

5. The lens barrel of claim 1, further comprising a lens driving mechanism for driving the lens frame along the optical axis direction of the lens, wherein,
   the lens driving mechanism and the second guide axis are disposed so as to adjoin each other.

6. The lens barrel of claim 5, wherein the lens driving mechanism and the second guide axis are disposed so as to further adjoin the first guide section.

7. An imaging device comprising the lens barrel of claim 1.

8. The imaging device of claim 7, wherein the imaging device is a camera.

* * * * *